(12) United States Patent
Ozawa et al.

(10) Patent No.: US 6,364,403 B1
(45) Date of Patent: Apr. 2, 2002

(54) VEHICLE FRONT END STRUCTURE

(75) Inventors: Ikuo Ozawa, Toyoake; Noriaki Maeda, Kariya; Takuya Usami, Kariya; Toshiki Sugiyama, Kariya; Norihisa Sasano, Ama-gun, all of (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/692,429

(22) Filed: Oct. 19, 2000

(30) Foreign Application Priority Data

Oct. 20, 1999 (JP) .......................................... 11-298494
Apr. 11, 2000 (JP) ........................................ 2000-109635

(51) Int. Cl.⁷ ............................................. B62D 25/08
(52) U.S. Cl. ................... 296/194; 296/188; 296/203.02
(58) Field of Search ............................ 296/194, 203.02, 296/188, 189; 180/68.4

(56) References Cited

U.S. PATENT DOCUMENTS

| | | | |
|---|---|---|---|
| 4,417,635 A | * 11/1983 | Thepault | 180/68.4 |
| 5,123,695 A | * 6/1992 | Kanemitsu et al. | 296/194 |
| 5,271,473 A | * 12/1993 | Ikeda et al. | 180/68.4 |
| 5,409,288 A | * 4/1995 | Masuda | 296/194 |
| 5,658,041 A | * 8/1997 | Girardot et al. | 296/194 |
| 6,260,609 B1 | * 7/2001 | Takahashi | 180/68.4 X |
| 2001/0001994 A1 | * 5/2001 | Enomoto et al. | 180/68.4 |
| 2001/0010275 A1 | * 8/2001 | Sasano et al. | 296/203.02 |
| 2001/0011614 A1 | * 8/2001 | Sasano et al. | 296/203.02 |

FOREIGN PATENT DOCUMENTS

| | | | | |
|---|---|---|---|---|
| JP | 3-208780 A | * | 9/1991 | ................. 296/194 |
| JP | 4-63774 A | * | 2/1992 | ................. 296/194 |
| JP | 4-197880 A | * | 7/1992 | ................. 296/194 |
| JP | A-4-243626 | | 8/1992 | |
| JP | 5-105114 A | * | 4/1993 | ................. 296/194 |
| JP | 5-105115 A | * | 4/1993 | ................. 296/194 |
| JP | 5-170135 A | * | 7/1993 | ................. 296/194 |
| JP | A-10-264856 | | 10/1998 | |

* cited by examiner

Primary Examiner—Joseph D. Pape
Assistant Examiner—Patricia Engle
(74) Attorney, Agent, or Firm—Harness, Dickey & Peirce, PLC

(57) ABSTRACT

A vehicle front end member including at least a radiator has an upper protrusion fixed to an upper insertion hole of a vehicle front end panel, and a lower protrusion fixed to a lower insertion hole of the front end panel. When an exterior force larger than a predetermined value is applied to the vehicle from a front side, a fixing state of the upper protrusion into the upper insertion hole is released, while a fixing state of the lower protrusion into the lower insertion hole is maintained. Therefore, is can prevent all the front end member from being separated from the front end panel when the exterior force is applied to the vehicle from the front i side. Accordingly, a damage of the front end member due to the exterior force is prevented while a collision of the front end member on a road surface is prevented.

27 Claims, 6 Drawing Sheets

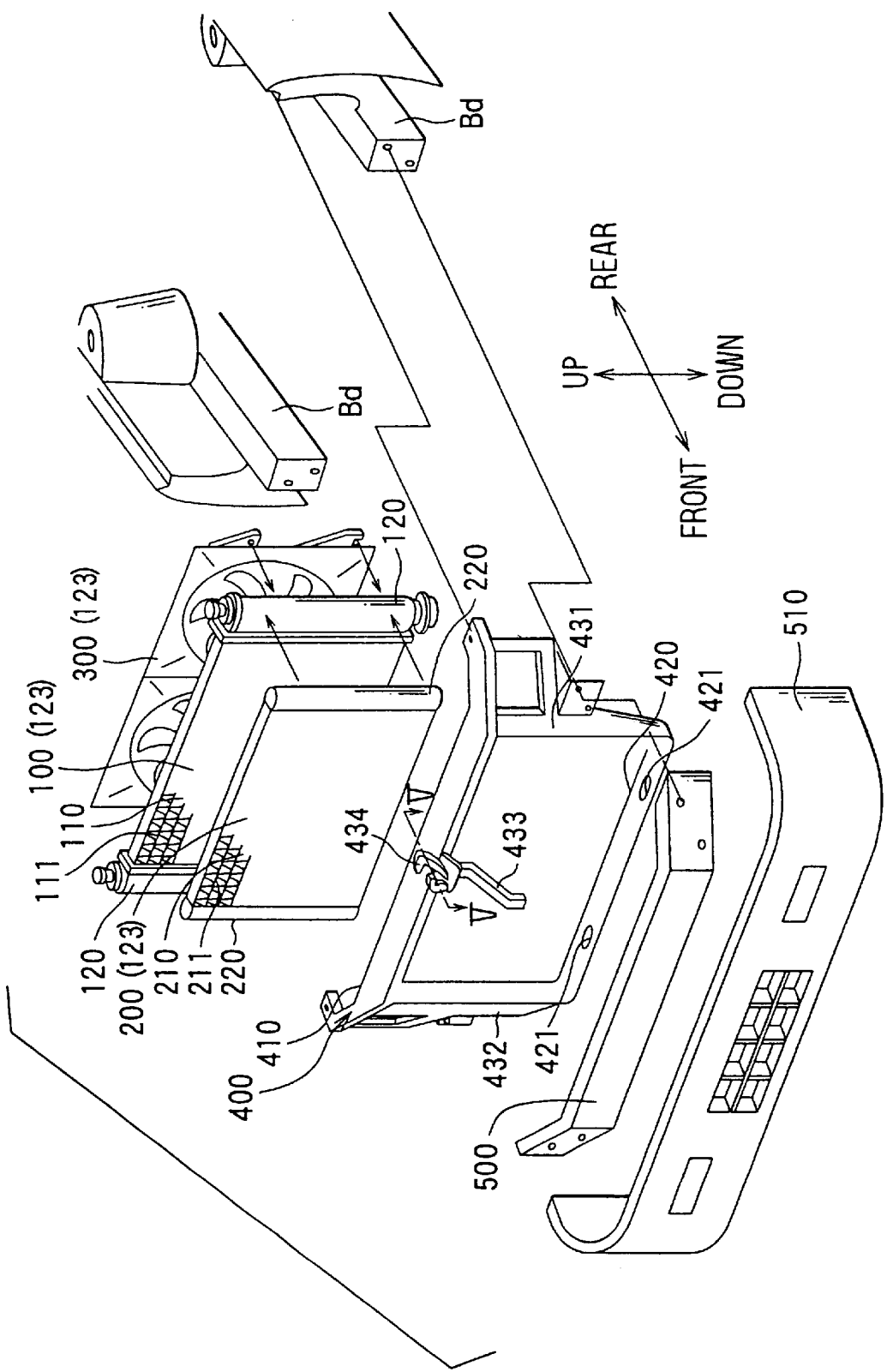

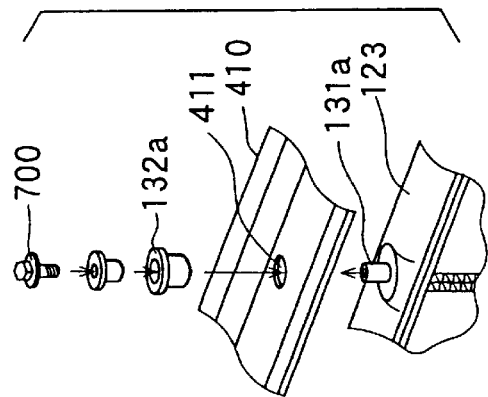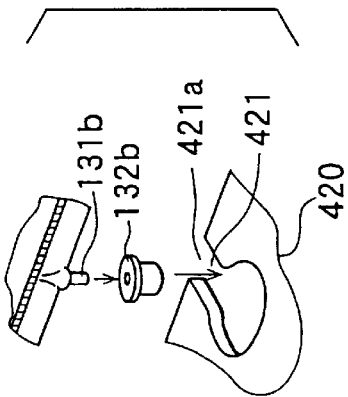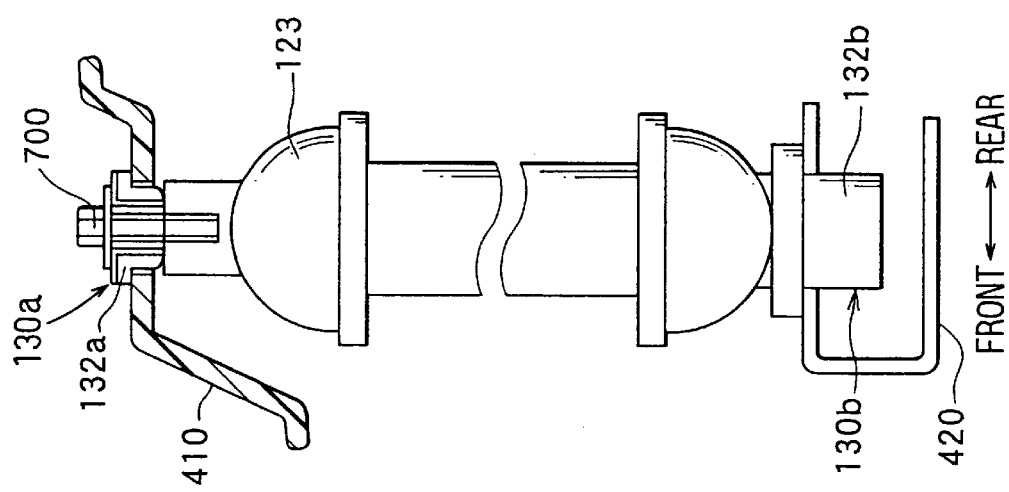

VEHICLE FRONT END STRUCTURE

CROSS-REFERENCE TO RELATED APPLICATION

This application is related to and claims priority from Japanese Patent Applications No. Hei. 11-298494 filed on Oct. 20, 1999, and No. 2000-109635 filed on Apr. 11, 2000, the contents of which are hereby incorporated by reference.

BACKGROUND OF THE INVENTION

1. Field of the Invention

The present invention relates to a vehicle front end structure around a front end panel to which front end components including at least a radiator are assembled.

2. Description of Related Art

In a conventional vehicle front end structure described in JP-A-10-264856, a thinned breaking notch is provided in a front end panel, so that the breaking notch is readily broken by an exterior force (colliding force) to absorb the exterior force. However, because the breaking notch is broken when the exterior force larger than a predetermined value is applied to a vehicle front side, the front end panel and vehicle front components including a radiator and a condenser may fall from an engine compartment onto a road surface, and may be damaged.

SUMMARY OF THE INVENTION

In view of the foregoing problems, it is an object of the present invention to provide a vehicle front end structure which prevents a damage of a vehicle front end member even when an exterior force larger than a predetermined value is applied to a vehicle body from a vehicle front side.

According to the present invention, plural fixing portions at which a front end member including at least a radiator is fixed are provided in a front end panel. When an exterior force larger than a predetermined value is applied to a vehicle body from a vehicle front side, at least one fixing state between the front end member and the fixing portions of the front end panel is maintained and the other fixing state therebetween is released, among plural fixing states between the front end member and the plural fixing portions of the front end panel. Accordingly, it can prevent all the front end member from falling from an engine compartment to a road surface when the exterior force is applied to the vehicle body from a vehicle front side, and a damage of the front end member is accurately prevented.

Preferably, the front end structure includes a fixing member which is disposed to be assembled to the front end panel from a vehicle rear side at the fixing portions corresponding to the other fixing state, in such a manner that a part of the front end member is inserted between the fixing member and the front end panel. Therefore, it can prevent the fixing states between the front end member and the fixing portions of the front end panel from being released by a force different from the exterior force, such as a vehicle vibration, while the falling of the front end member is accurately prevented.

Further, the front end panel includes an upper beam member extending horizontally at a vehicle upper side, and a lower beam member extending horizontally at a vehicle lower side. The upper beam member has an upper insertion hole penetrating through the upper beam member in an up-down direction, into which an upper protrusion of the front end member is inserted, and the lower beam member has a lower insertion hole penetrating through the lower beam member in an up-down direction, into which a lower protrusion of the front end member is inserted. In the front end structure, any one of the upper insertion hole and the lower insertion hole has an opening opened toward a vehicle rear side. Thus, when the exterior force is applied to the vehicle body from a vehicle front side, an engagement state between the insertion hole having the opening and the protrusion is released, and an engagement state between the insertion hole without the opening and the protrusion is maintained. Accordingly, the front end member is rotated around an end portion at a side where the opening is not provided, toward a vehicle rear side. As a result, the front end structure can accurately prevent a damage of the front end member with a simple structure.

Alternatively, the front end structure has a beam deformation member disposed at a vehicle front side of the front end panel, and the beam deformation member is coupled to the upper beam member so that the upper beam member is bent to an upper side through the beam deformation member when the exterior force is applied to the vehicle body from a vehicle front side. Therefore, the front end structure can accurately prevent a damage of the front end member with a simple structure.

BRIEF DESCRIPTION OF THE DRAWINGS

Additional objects and advantages of the present invention will be more readily apparent from the following detailed description of preferred embodiments when taken together with the accompanying drawings, in which:

FIG. 4 is a disassembled perspective view of a vehicle front end structure according to a second preferred embodiment of the present invention;

FIG. 6A is a schematic view showing a part of a vehicle front end structure according to a third preferred embodiment of the present invention, and FIGS. 6B and 6C are disassembled views showing a part of the vehicle front end structure when being viewed from an upper side and a lower side, respectively, according to the third embodiment;

DETAILED DESCRIPTION OF THE PRESENTLY PREFERRED EMBODIMENTS

Preferred embodiments of the present invention will be described hereinafter with reference to the accompanying drawings.

A first preferred embodiment of the present invention will be now described with reference to 1–3. In the first embodiment, the present invention is typically applied to a vehicle where a radiator for cooling engine-cooling water, a condenser of a refrigerant cycle, and a blower unit for blowing cooling air toward the radiator and the condenser are mounted on a vehicle front end portion.

Figure 1:
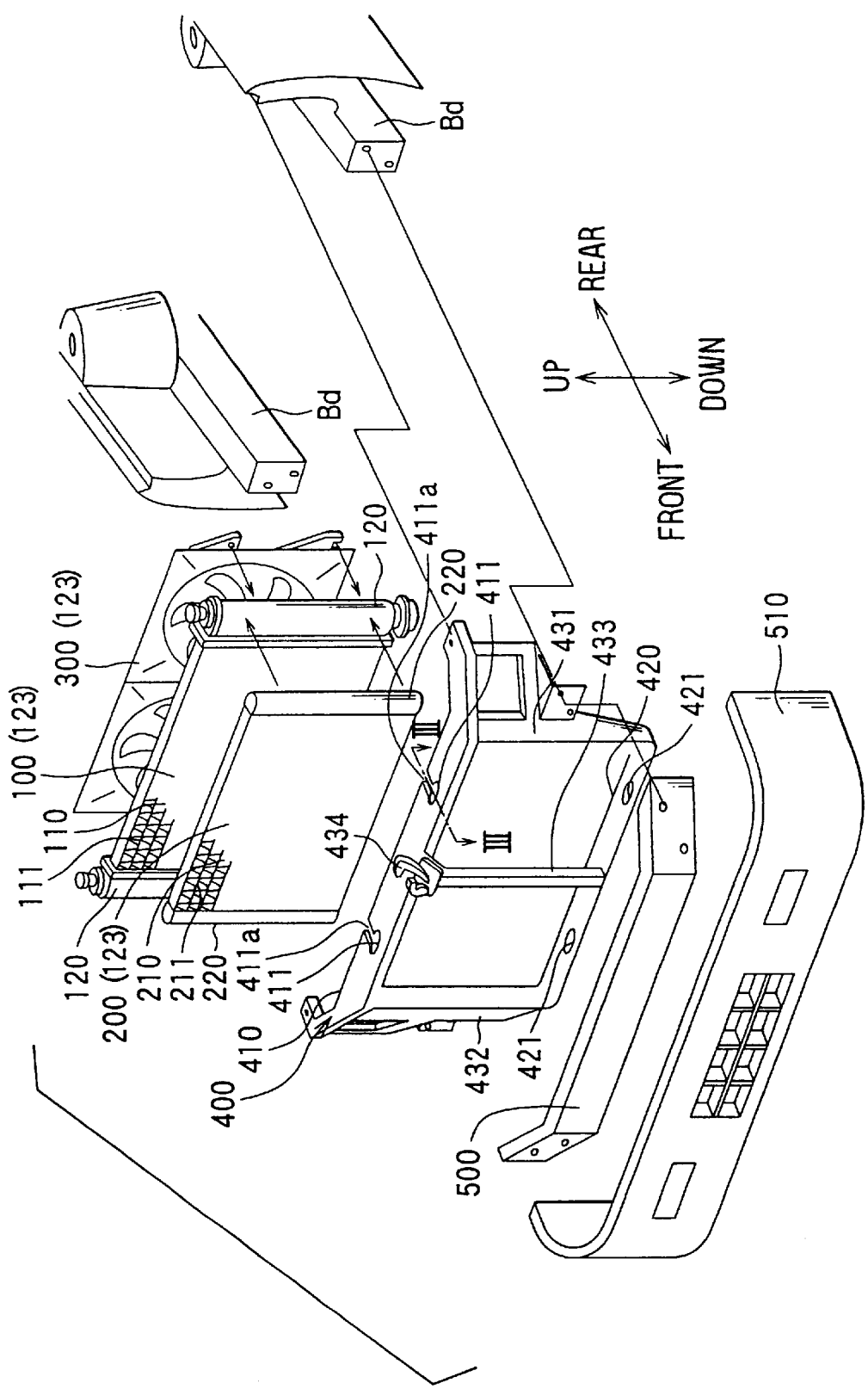
FIG. 1 is a disassembled perspective view of a vehicle front end structure according to a first preferred embodiment of the present invention.

As shown in FIG. 1, a radiator 100 is disposed at a vehicle rear side of a condenser 200, and a blower unit 300 is disposed at a vehicle rear side of the radiator 100. In the first embodiment, the radiator 100, the condenser 200 and the blower unit 300 are referred to as "front end member 123".

The radiator 100 includes a radiator core 110 having plural radiator tubes 111 through which cooling water flows, and both radiator tanks 120 connected to both ends of each radiator tube 111 in a longitudinal direction of the radiator tubes 111 to communicate with each radiator tube 111. Similarly, the condenser 200 includes a condenser core 210 having plural condenser tubes 211 through which refrigerant flows, and both condenser tanks 220 connected to both ends of each condenser tube 211 in a longitudinal direction of the condenser tubes 211 to communicate with each condenser tube 211. The radiator 100 and the condenser are mounted in the vehicle, so that the tubes 111, 211 are disposed to extend in a horizontal direction, and the tanks 120, 220 are disposed to extend in an up-down direction (vertical direction).

The front end member 123 including the radiator 100, the condenser 200 and the blower unit 300 is assembled to be fixed to a front end panel 400 made of resin. The front end panel 400 includes an upper beam 410 provided at an upper side to extend in the horizontal direction, a lower beam 420 provided at a lower side to extend in the horizontal direction, supporting pillars 431, 432 extending in the vertical direction to connect both the upper and lower beams 410, 420, and a center brace 433 (center supporting pillar).

A hood lock 434 for fixing an engine hood (bonnet) is attached to the center brace 433.

Figure 2:
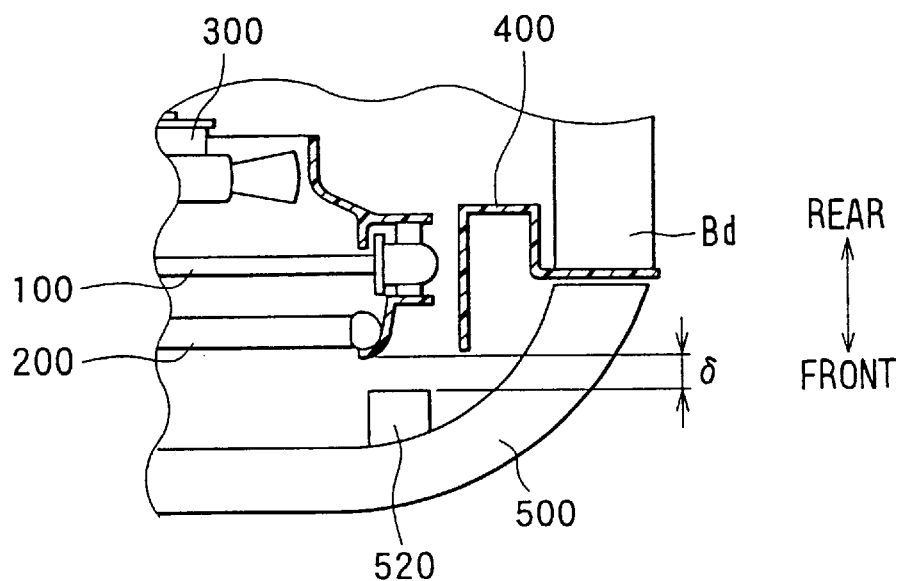
FIG. 2 is an enlarged view showing a part of the vehicle front end structure according to the first embodiment.

A bumper 500 (buffer member) made of a metal is covered by a bumper cover 510 made of a resin. As shown in FIG. 2, the bumper 500 and the front end panel 400 are fixed to a vehicle side body Bd by a fastening member such as bolt. An adjustment protrusion 520 for adjusting a distance δ between the bumper 500 and the front end member 123 is provided in the bumper 500 at a side of the condenser 200 of the front end member 123.

In the front end member 123, the condenser 200 and the blower unit 300 are assembled to the radiator 100 using a fastening member such as a bolt so that an integrated member is formed. Thereafter, the integrated front end member 123 is assembled to the front end panel 400 to be fixed to the front end panel 400.

Figure 3:
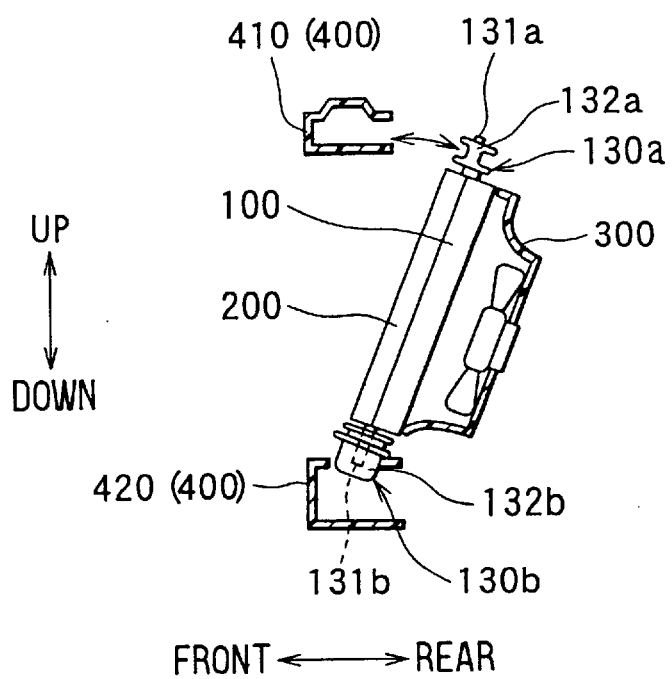
FIG. 3 is a cross-sectional view taken along line III—III in FIG. 1.

Next, an assembling method of the integrated front end member 123 and the front end panel 400 will be now described. As shown in FIG. 3, a pin 131a protruding toward an upper side is provided at an upper side end of the radiator 100 (e.g., an upper end of the radiator tank 120 in a tank longitudinal direction), and a pin 131b protruding toward a lower side is provided at a lower side end of the radiator 100 (e.g., an lower end of the radiator tank 120 in a tank longitudinal direction). Further, grommets 132a, 132b (rubber bushes) made of an elastic material such as rubber are attached to both the pins 131a, 131b, respectively, so that an attachment upper protrusion 130a and an attachment lower protrusion 130b are formed.

The upper grommet 132a is formed into a drum shape having a flange portion at both ends in an axial direction of a grommet body portion, protruding toward a radial outside. The lower grommet 132b has a flange portion at an approximate center in an axial direction of a grommet body portion, protruding toward a radial outside. A radial dimension of the flange portion of the lower grommet 132b is larger than that of the upper grommet 132a.

On the other hand, as shown in FIG. 1, an upper insertion hole 411 is provided in the upper beam 410 of the front end panel 400 to penetrate through the upper beam 410 in the up-down direction. The upper insertion hole 411 is formed into a key hole like to have an opening 411a opened toward a vehicle rear side. The upper protrusion 130a is inserted into the upper insertion hole 411. In the first embodiment, both the upper insertion holes 411 are provided to correspond to both the upper protrusions 130a of the front end member 123.

A round lower insertion hole 421 is provided in the lower beam 420 of the front end panel 400 to penetrate through the lower beam 420 in the up-down direction. The lower insertion hole 421 is a closed round hole. In the first embodiment, both the lower insertion holes 421 are provided to correspond to both the lower protrusions 130b.

When the front end member 123 is assembled to the front end panel 400, as shown in FIG. 3, the lower protrusion 130b is inserted into the lower insertion hole 421, and thereafter, the front end part 123 is rotated around a lower end of the front end member 123 toward a vehicle front side in a state where the lower protrusion 130b is inserted into the lower insertion hole 421, so that the upper protrusion 130a is inserted into the upper insertion hole 411 from the opening 411a. Therefore, in the first embodiment, the insertion holes 411, 421 are used as a fixing portion for fixing the front end member 123 to the front end panel 400. According to a front end structure of the first embodiment, when an exterior force larger than a predetermined value is applied to a vehicle front end, the bumper 500 is deformed toward the front end member 123 while the exterior force is absorbed by the bumper 500. When the adjustment protrusion 520 collides with a strength holding portion (condenser tank 220, in the first embodiment) of the front end member 123 (condenser 200, in the first embodiment), an attachment state (fixing state) of the upper protrusion 130a into the upper insertion hole 411 is released. Even in this case, because the attachment state (fixing state) of the lower protrusion 130b into the lower insertion hole 421 is maintained, the front end member 123 is rotated around the lower end of the front end member 123 toward a vehicle rear side, as shown in FIG. 3. Accordingly, all the front end member 123 is not separated from the front end panel 400, and it can prevent all the front end member 123 from falling from the engine compartment. Thus, a damage of the front end member 123 is prevented, while it can prevent the front end member 123 from colliding with a road surface.

A necessary exterior force, necessary for releasing the insertion state of the upper protrusion 130a into the upper insertion hole 411, is determined based on a vehicle condition such as a strength of the bumper 500, the distance δ between the adjustment protrusion 520 and the front end member 123, an elastic coefficient of the grommet 132a and dimensions of the upper insertion hole 411 and the opening 411a, and is necessary to be selected suitably for a vehicle.

A second preferred embodiment of the present invention will now described with reference to FIGS. 4, 5A and 5B.

In the above-described first embodiment, the upper protrusion 130a is released from the opening 411a of the upper insertion hole 411, while the front end member 123 is rotated to a vehicle rear side around a lower end of the front end member 123. In the second embodiment, the attachment structure is formed in such a manner that the upper protrusion 130*a* of the front end member 123 will be released from the upper insertion hole 411 that is formed into a round hole similarly to the lower insertion hole 421. In the second embodiment, the parts similar to those of the first embodiment are indicated with the same reference numbers, and the explanation thereof is omitted.

Figure 5A:
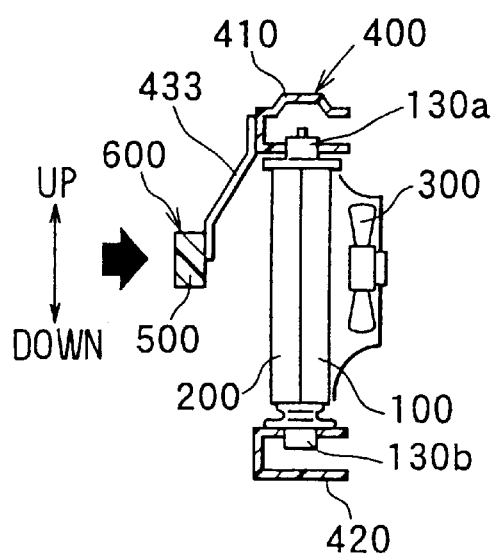
FIG. 5A is a cross-sectional view taken along line V—V in FIG. 4, showing a state where an exterior force larger than a predetermined value is not applied to a vehicle front side.
Figure 5B:
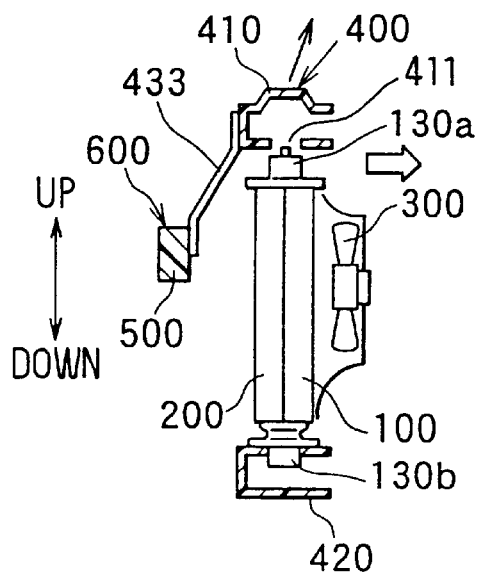
FIG. 5B is a cross-sectional view taken along line V—V in FIG. 4, showing a state where the exterior force larger than a predetermined value is applied to the vehicle front side.

As shown in FIGS. 4, 5A, 5B, in the second embodiment, the center brace 433 is disposed to protrude to a vehicle front side so that a front end of the center brace 433 is to a bumper 500 of the vehicle. That is, as shown in FIGS. 5A, 5B, a beam deformation member 600, for bending the upper beam 410 to an upper side when the exterior force larger than a predetermined value is applied to a front side of the front end panel 400, is formed.

Accordingly, when the exterior force larger than the predetermined value is applied to the bumper 500, the upper beam 410 is bent to the upper side as shown in FIG. 5B, the insertion state of the upper protrusion 130*a* of the front end member 123 into the upper insertion hole 411 is released. In this state, because the insertion state of the lower protrusion 130*b* into the lower insertion hole 421 is maintained, the front end member 123 is rotated (moved) around a lower end of the front end member 123 toward a vehicle rear side. That is, although the fixing state between the upper protrusion 130*a* of the front end member 123 and the upper insertion hole 411 of the front end panel 400 is released, the fixing state between the lower protrusion 130*b* of the front end member 123 and the lower insertion hole 421 of the front end panel 400 is maintained. As a result, the effect similar to that of the above-described first embodiment can be obtained.

A third preferred embodiment of the present invention will be now described with reference to FIGS. 6A, 6B and 6C. In the above-described first and second embodiments, when the exterior force larger than the predetermined value is applied to the bumper 500 from the vehicle front side, the insertion state (fixing state) of the upper protrusion 130*a* into the upper insertion hole 411 is released. However, in the third embodiment, when the exterior force larger than the predetermined value is applied to the bumper 500 from the vehicle front side, the insertion state (fixing state) of the lower protrusion 130*b* into the lower insertion hole 421 is released, while the insertion state of the upper protrusion 130*a* into the upper insertion hole 411 is maintained. In the third embodiment, the parts similar to those of the above-described first embodiment are indicated with the same reference numbers, and the explanation thereof is omitted.

A round-shaped upper insertion hole 411 is provided in the upper beam 410 of the front end panel 400 as shown in FIG. 6B, and a lower insertion hole 421 is formed in the lower beam 420 of the front end panel 400 into a key-like hole to have an opening 421*a* opened toward a vehicle rear side as shown in FIG. 6C. Further, as shown in FIG. 6A, the upper protrusion 130*a* is fixed to the upper beam 410 by using a bolt 700, and the lower protrusion 130*b* is inserted into the lower insertion hole 421 from the opening 421*a* to be attached thereto. Thus, when the exterior force larger than the predetermined value is applied to the vehicle front side, the fixing state of the lower protrusion 130*b* and the lower insertion hole 421 is released while the fixing state of the upper protrusion 130*a* and the upper insertion hole 411 is maintained, and therefore, the front end member 123 is rotated (moved) around an upper end of the front end member 123 toward a vehicle rear side.

As a result, the effect similar to that of the above-described first embodiment can be obtained.

Figure 7:
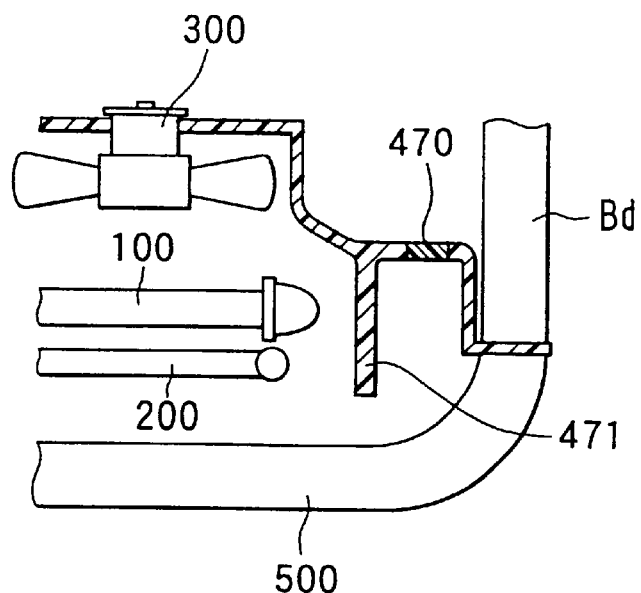
FIG. 7 is an enlarged view showing a part of a vehicle front end structure according to a fourth preferred embodiment.

A fourth preferred embodiment of the present invention will be now described with reference to FIG. 7. In the above-described first through third embodiments, when an exterior force larger than a predetermined value is applied to a vehicle body from a vehicle front side, the front end member 123 is partially separated from the front end panel 400 so that a damage of the front end member 123 is prevented. However, in the fourth embodiment, when an exterior force larger than a predetermined value is applied from a vehicle front side, all the front end panel 400 and the front end member 123 are moved to a vehicle rear side so that a damage of the front end member 123 is prevented.

Specifically, the front end panel 400 is fixed to the vehicle body Bd through an elastic member 470 made of an elastic material such as rubber elastically deformed. Further, an adjustment protrusion 471 for adjusting a clearance δbetween the bumper 500 and the front end panel 400 is integrally formed with the front end panel 400.

When an exterior force larger than a predetermined value is applied to the bumper 500, the front end panel 400 is connected to the vehicle body Bd through the elastic member 470, and is moved to a vehicle rear side without being separated from the vehicle body Bd. Thus, a damage of the front end member 123 is prevented, while it can prevent the front end member 123 from colliding with a road surface.

A fifth preferred embodiment of the present invention will be now described with reference to FIGS. 8A and 8B. In the above-described first embodiment, the fixing state (engagement state) of the upper protrusion 130*a* into the upper insertion hole 411 formed into the key-like hole is released so that the falling of the front end member 123 is prevented. However, when the hardness of the grommet 132*a* is low (soft), the fixing state of the upper protrusion 130*a* into the upper insertion hole 411 may be released by force different from the exterior force, such as a vehicle vibration.

Figure 8A:
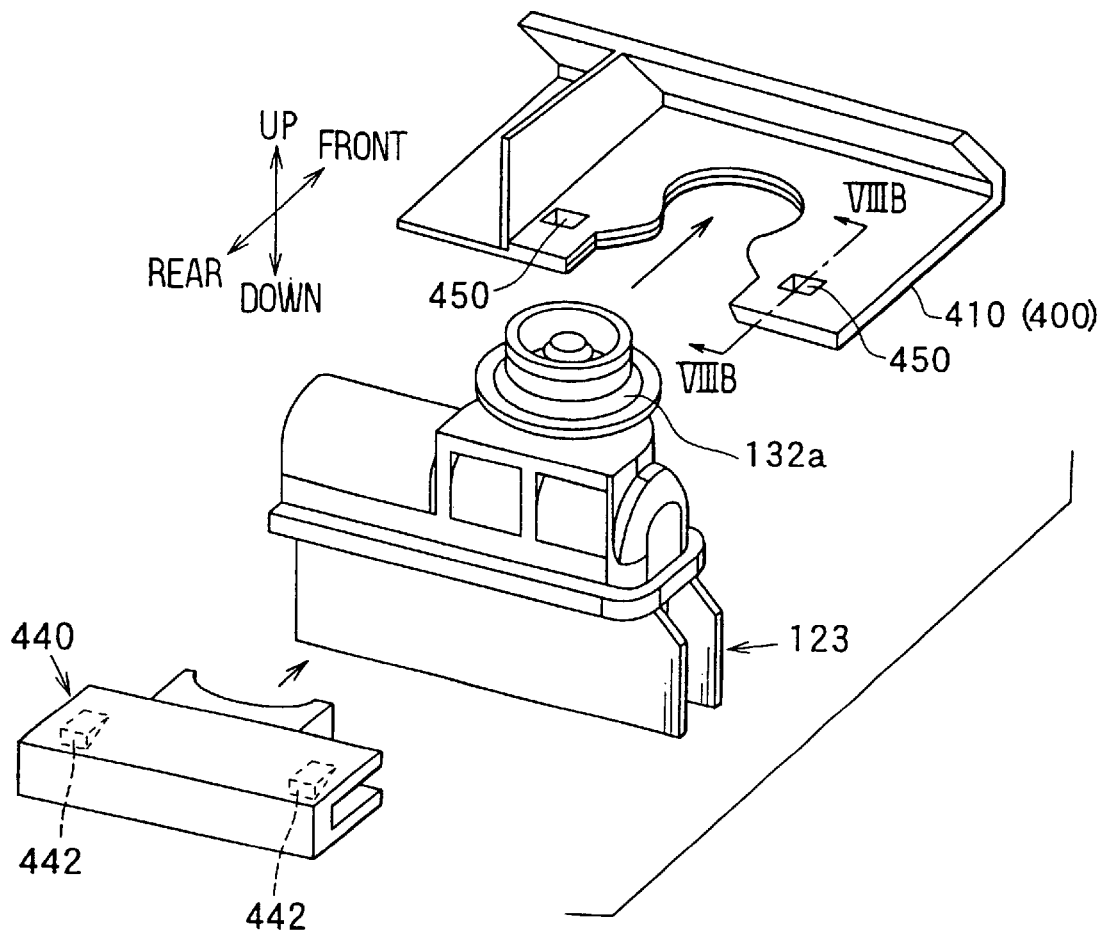
FIG. 8A is a disassembled perspective view of a fixing portion in a vehicle front end structure according to a fifth preferred embodiment of the present invention.

In the fifth embodiment, as shown in FIG. 8A, a stopper (fixing member) 440 made of resin is disposed to be engaged with the upper beam 410 of the front end panel 400 from a vehicle rear side so that a part of front end member 123 is inserted between the stopper 440 and the front end panel 400. FIG. 8B shows the state after the stopper 440 and the upper beam 410 of the front end panel 400 are engaged. As shown in FIG. 8B, the stopper 440 includes a clip portion 441 having an approximate U-shaped cross section, and an engagement protrusion 442 engaging with an engagement hole 450 provided in the upper beam 410. In the fifth embodiment, both the engagement protrusion 442 are provided to be engaged with both the engagement holes 450.

Figure 8B:
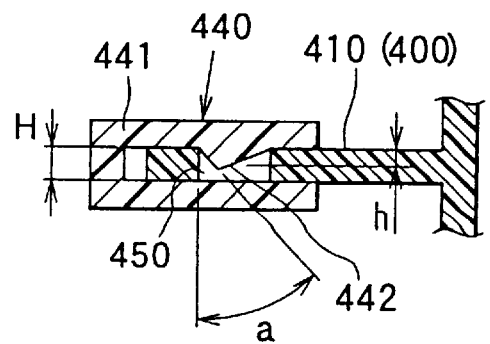
FIG. 8B is a cross-sectional view taken along line VIIIB—VIIIB in FIG. 8A, after assembling.

A contact area of the clip portion 441 with the upper beam 410 is adjusted by adjusting a clip insertion distance H, and an engagement force of the engagement protrusion 442 with the engagement hole 450 is adjusted by adjusting a protrusion height "h" of the engagement hole 450 and an angle "a" defined by the engagement hole 450 and the engagement protrusion 442, as shown in FIG. 8B. Thus, when an exterior force larger than a predetermined value is applied to a vehicle body from a vehicle front side, the fixing state (engagement state) between the front end panel 400 and the stopper 450 is released by suitably setting the clip insertion distance H, the protrusion height "h" and the angle "a".

In the fifth embodiment, when the front end member 123 is assembled to the front end panel 400, the lower protrusion 130*b* is inserted into the lower insertion hole 421, and thereafter, the front end part 123 is rotated around a lower end of the front end member 123 toward a vehicle front side in a state where the lower protrusion 130b is inserted into the lower insertion hole 421, so that the upper protrusion 130a is inserted into the upper insertion hole 411 from the opening 411a, similarly to the first embodiment. Thereafter, the stopper 450 is assembled to the upper beam 410 of the front end panel 400.

Accordingly, regardless of the hardness of the grommet 132a, it can prevent the fixing state of the front end member 123 from being released due to a force different to the exterior force, such as the vehicle vibration.

Although the present invention has been fully described in connection with the preferred embodiments thereof with reference to the accompanying drawings, it is to be noted that various changes and modifications will become apparent to those skilled in the art.

For example, in the above-described embodiments of the present invention, the front end panel 400 is made of a resin; however, may be made of a metal.

In the above-described first through third embodiments, the front end member 123 is moved using the upper end or the lower end as a rotation center. However, the front end member 123 may be disposed to be moved using a right end or a left end as a center.

In the above-described fifth embodiment, the stopper 450 is assembled to the upper beam 410 having the upper insertion hole 411. However, in a case such as the above-described second embodiment, where the lower insertion hole 421 is opened to a vehicle rear side, the stopper 450 is assembled to the lower beam 420 having the lower insertion hole 421. Further, in the above-described fifth embodiment, as a fixing structure of the stopper 450, the clip portion 441 and the engagement protrusion 442 are used. However, as the fixing structure of the stopper 450, the other member which is broken when the exterior force larger than the predetermined value is applied thereto may be used.

Such changes and modifications are to be understood as being within the scope of the present invention as defined by the appended claims.

What is claimed is:

1. A front end structure of a vehicle, comprising:
   a front end member including at least a radiator, said front end member being mounted on the vehicle at a vehicle front end side;
   a front end panel to which said front end member is assembled;
   a deformation member for deforming said front end panel when an external force is applied to a vehicle body from a vehicle front side; and
   a bumper that is disposed to be directly connected to said front end panel through the deformation member; wherein:
   said front end panel has at least two fixing portions at which said front end member is fixed at different positions to form at least two fixing connections between said fixing portions and said front end member; and
   when said exterior force is larger than a predetermined value and is applied to said vehicle body from said vehicle front side, a first fixing connection between said front end member and said fixing portions is maintained and a second fixing connection therebetween is released.

2. The front end structure according to claim 1, wherein:
   said fixing portions are provided in said front end panel at positions corresponding to an upper end and a lower end of said front end member; and
   said fixing connection corresponding to said upper end of said front end member is released when the exterior force is applied to the vehicle.

3. The front end structure according to claim 1, wherein:
   said front end panel includes an upper beam member extending horizontally at a vehicle upper side, and a lower beam member extending horizontally at a vehicle lower side;
   said front end member has an upper protrusion protruding upwardly, at an upper end of said front end member;
   said front end member further has a lower protrusion protruding downwardly, at a lower end of said front end member;
   said upper beam member has an upper insertion hole penetrating through said upper beam member in an up-down direction, into which said upper protrusion is inserted;
   said lower beam member has a lower insertion hole penetrating through said lower beam member in an up-down direction, into which said lower protrusion is inserted; and
   said deformation member is coupled to said upper beam member so that said upper beam member is bent to an upper side through said deformation member when the exterior force is applied to the vehicle body from the vehicle front side.

4. The front end structure according to claim 1, wherein said front end member is directly fixed to said front end panel at said fixing portions.

5. The front end structure according to claim 1, wherein said radiator is disposed so that cooling water for cooling a vehicle engine flows therein.

6. The front end structure according to claim 5, wherein said front end member includes said radiator, a condenser of a refrigerant cycle and a blower unit for blowing air toward said radiator and said condenser.

7. The front end structure according to claim 6, wherein said radiator, said condenser and said blower unit are attached to said front end panel, after being integrally assembled.

8. The front end structure according to claim 1, wherein:
   said front end panel includes an upper beam member extending horizontally at a vehicle upper side, a lower beam member extending horizontally at a vehicle lower side, and a supporting pillar disposed at a front side of said upper beam member and said lower beam member to be connected to both said upper beam member and said lower beam member; and
   said deformation member is directly connected to a portion of said supporting pillar, between said upper beam member and said lower beam member.

9. A front end structure of a vehicle, comprising;
   a front end member including at least a radiator, said front end member being mounted on the vehicle at a vehicle front side;
   a front end panel to which said front end member is assembled; wherein:
   said front end panel has at least two fixing portions at which said front end member is fixed at different positions to form at least two fixing connections between said fixing portions and said front end member; and when an exterior force larger than a predetermined value is applied to a vehicle body from a vehicle front side, a first fixing connection between said front end member and said fixing portions is maintained as a second fixing connection therebetween is released; wherein said front end structure further includes:
a fixing member disposed to be assembled to said front end panel from a vehicle rear side at said fixing portions corresponding to said second fixing connection, in such.

10. The front end structure according to claim 5, wherein said radiator is disposed so that cooling water for cooling a vehicle engine flows therein.

11. The front end structure according to claim 10, wherein said front end member includes said radiator, a condenser of a refrigerant cycle and a blower unit for blowing air toward said radiator and said condenser.

12. The front end structure according to claim 11, wherein said radiator, said condenser and said blower unit are attached to said front end panel, after being integrally assembled.

13. A front end structure of a vehicle, comprising:
a front end member including at least a radiator, said front end member being mounted on the vehicle at a vehicle front end side;
a front end panel to which said front end member is assembled; wherein:
said front end panel has at least two fixing portions at which said front end member is fixed at different positions to form at least two fixing connections between said fixing portions and said front end member;
when an exterior force larger than a predetermined value is applied to a vehicle body from a vehicle front side, a first fixing connection between said front end member and said fixing portions is maintained and a second fixing connection therebetween is released;
said fixing portions are provided in said front end panel at positions corresponding to an upper end and a lower end of said front end member; and
said fixing connection corresponding to said lower end of said front end member is released when the exterior force is applied to the vehicle body from a vehicle front side.

14. The front end structure according to claim 13, wherein said radiator is disposed so that cooling water for cooling a vehicle engine flows therein.

15. The front end structure according to claim 14, wherein said front end member includes said radiator, a condenser of a refrigerant cycle and a blower unit for blowing air toward said radiator and said condenser.

16. The front end structure according to claim 15, wherein said radiator, said condenser and said blower unit are attached to said front end panel, after being integrally assembled.

17. A front end structure of a vehicle, comprising:
a front end member including at least a radiator, said front end member being mounted on the vehicle at a vehicle front end side;
a front end panel to which said front end member is assembled; wherein:
said front end panel has at least two fixing portions at which said front end member is fixed at different positions to form at least two fixing connections between said fixing portions and said front end member;

when an exterior force larger than a predetermined value is applied to a vehicle body from a vehicle front side, a first fixing connection between said front end member and said fixing portions is maintained and a second fixing connection therebetween is released;
said front end panel includes an upper beam member extending horizontally at a vehicle upper side, and a lower beam member extending horizontally at a vehicle lower side;
said front end member has an upper protrusion protruding upwardly, at an upper end of said front end member;
said front end member further has a lower protrusion protruding downwardly, at a lower end of said front end member;
said upper beam member has an upper insertion hole penetrating through said upper beam member in an up-down direction, into which said upper protrusion is inserted;
said lower beam member has a lower insertion hole penetrating through said lower beam member in an up-down direction, into which said lower protrusion is inserted; and
any one of said upper insertion hole and said lower insertion hole has an opening opened toward a vehicle rear side.

18. The front end structure according to claim 17, wherein:
said upper insertion hole has said opening opened toward the vehicle rear side; and
when the exterior force larger than the predetermined value is applied to the vehicle body from a vehicle front side, said upper protrusion is released from said upper insertion hole through said opening, while an insertion state of said lower protrusion into said lower insertion hole is maintained.

19. The front end structure according to claim 17, wherein said radiator is disposed so that cooling water for cooling a vehicle engine flows therein.

20. The front end structure according to claim 19, wherein said front end member includes said radiator, a condenser of a refrigerant cycle and a blower unit for blowing air toward said radiator and said condenser.

21. The front end structure according to claim 20, wherein said radiator, said condenser and said blower unit are attached to said front end panel, after being integrally assembled.

22. A front end structure of a vehicle, comprising:
a front end member including at least a radiator, said front end member being mounted on the vehicle at a vehicle front end side; and
a front end panel to which said front end member is assembled; wherein:
said front end panel includes an upper beam member extending horizontally at a vehicle upper side, and a lower beam member extending horizontally at a vehicle lower side;
said front end member has an upper protrusion protruding upwardly, at an upper end of said front end member;
said front end member further has a lower protrusion protruding downwardly, at a lower end of said front end member;
said upper beam member has an upper insertion hole penetrating through said upper beam member in an up-down direction, into which said upper protrusion is inserted;

said lower beam member has a lower insertion hole penetrating through said lower beam member in an up-down direction, into which said lower protrusion is inserted; and any one of said upper insertion hole and said lower insertion hole has an opening opened toward a vehicle rear side.

23. The front end structure according to claim 22, wherein:

said upper insertion hole has said opening opened toward the vehicle rear side; and when the exterior force larger than the predetermined value is applied to the vehicle body from a vehicle front side, said upper protrusion is released from said upper insertion hole through said opening, while an insertion state of said lower protrusion into said lower insertion hole is maintained.

24. The front end structure according to claim 22, wherein:

said lower insertion hole has said opening opened toward the vehicle rear side; and when the exterior force larger than the predetermined value is applied to the vehicle body from a vehicle front side, said lower protrusion is released from said lower insertion hole through said opening, while an insertion state of said upper protrusion into said upper insertion hole is maintained.

25. A front end structure of a vehicle, comprising:

a front end member including at least a radiator, said front end member being mounted on the vehicle at a vehicle front end side;

a front end panel to which said front end member is assembled;

a beam deformation member disposed at a vehicle front side of said front end panel, wherein:

said front end panel includes an upper beam member extending horizontally at a vehicle upper side, and a lower beam member extending horizontally at a vehicle lower side;

said front end member has an upper protrusion protruding upwardly, at an upper end of said front end member;

said front end member further has a lower protrusion protruding downwardly, at a lower end of said front end member;

said upper beam member has an upper insertion hole penetrating through said upper beam member in an up-down direction, into which said upper protrusion is inserted; and said lower beam member has a lower insertion hole penetrating through said lower beam member in an up-down direction, into which said lower protrusion is inserted;

said beam deformation member is coupled to said upper beam member so that said upper beam member is bent to an upper side through said beam deformation member when an exterior force is applied to a vehicle body from a vehicle front side.

26. A front end structure of a vehicle, comprising:

a front end member including at least a radiator, said front end member being mounted on the vehicle at a vehicle front end side;

a front end panel to which said front end member is assembled; and an elastic member elastically deformed when an exterior force larger than a predetermined value is applied to a vehicle body from a vehicle front side, wherein said front end panel is assembled to the vehicle body through said elastic member; and said entire front end panel is displaced to a vehicle rear side when said elastic member is elastically deformed.

27. The front end structure according to claim 26, wherein said front end panel is provided integrally with said elastic member.

* * * * *